United States Patent
Tanabe

(10) Patent No.: US 10,147,026 B2
(45) Date of Patent: Dec. 4, 2018

(54) PRINT CONTROL APPARATUS AND CONTROL METHOD FOR DETERMINING WHETHER CONTINUOUS PRINTING PROCESSING IS NOT EXECUTABLE

(71) Applicant: CANON KABUSHIKI KAISHA, Tokyo (JP)

(72) Inventor: Masaki Tanabe, Sagamihara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/600,489

(22) Filed: May 19, 2017

(65) Prior Publication Data
US 2017/0344862 A1    Nov. 30, 2017

(30) Foreign Application Priority Data

May 30, 2016    (JP) .................................. 2016-107910

(51) Int. Cl.
*G06K 15/02*    (2006.01)
*H04N 1/00*    (2006.01)
*H04N 1/23*    (2006.01)

(52) U.S. Cl.
CPC ..... *G06K 15/1809* (2013.01); *H04N 1/00957* (2013.01); *H04N 1/2353* (2013.01); *H04N 2201/0082* (2013.01); *H04N 2201/3271* (2013.01)

(58) Field of Classification Search
None
See application file for complete search history.

(56) References Cited

U.S. PATENT DOCUMENTS

| | | | |
|---|---|---|---|
| 6,678,068 B1 * | 1/2004 | Richter | G06F 3/1204 358/1.1 |
| 2008/0075478 A1 * | 3/2008 | Kohara | G03G 15/553 399/16 |
| 2014/0293317 A1 * | 10/2014 | Xu | H04N 1/00832 358/1.14 |

FOREIGN PATENT DOCUMENTS

| | | | |
|---|---|---|---|
| JP | 2000108463 A | * | 4/2000 |
| JP | 2012-192658 A | | 10/2012 |
| JP | 2012192658 A | * | 10/2012 |

* cited by examiner

*Primary Examiner* — Thomas D Lee
(74) *Attorney, Agent, or Firm* — Canon U.S. A., Inc. IP Division

(57) ABSTRACT

A print control apparatus includes an output unit that outputs information for displaying a screen indicating that continuous printing processing is not executable in a case where it is determined that continuous printing processing is not executable. In a case where the information for displaying the screen indicating that continuous printing processing is not executable is output, the screen indicating that continuous printing processing is not executable is displayed on a display unit.

17 Claims, 6 Drawing Sheets

PRINT CONTROL APPARATUS AND CONTROL METHOD FOR DETERMINING WHETHER CONTINUOUS PRINTING PROCESSING IS NOT EXECUTABLE

BACKGROUND

Field

The present disclosure relates to a print control apparatus and a control method.

Description of the Related Art

Conventionally, a print control apparatus has been known that continuously processes a plurality of jobs. Such a print control apparatus applies a technology called continuous printing that feeds a recording medium to be printed subsequent to a print path before a recording medium that has been printed is completely discharged for continuously processing a plurality of jobs. The continuous printing can reduce the time for completion of printing, compared with a case where feeding of a recording medium to be printed next is started after a recording medium that has been printed is completely discharged. When a print control apparatus receives a plurality of jobs, the jobs may not always be processed by the continuous printing. For example, with some print settings for the plurality of jobs, the jobs may not be processed by the continuous printing.

For example, Japanese Patent Laid-Open No. 2012-192658 discloses that whether continuous printing is executable is determined based on set values regarding the sizes of recording media among print settings for a first job and a second job. According to Japanese Patent Laid-Open No. 2012-192658, if it is determined that continuous printing is executable, the two jobs are continuously processed. If it is determined that the continuous printing is not executable, a recording medium for the second job is fed after a recording medium having undergone the first job is completely discharged.

A commercial print control apparatus configured to support high-speed printing may not support the continuous printing and, in order to restart job processing after the printing operation stops once between job processes, can require processing for discharging all of recording media on a conveying path or can require a preparation operation such as registration adjustment. Such a preparation operation may need a time period from the stop of job processing to the restart of the job processing. For that, in order to understand a processing state of a job appropriately, a user may need to properly understand that continuous printing is not executable for a job transmitted from an external apparatus to the print control apparatus if it occurs.

Japanese Patent Laid-Open No. 2012-192658 does not consider notification to a user of a result of determination on whether continuous printing is executable. This may disadvantageously prevent a user from understanding that continuous printing is not executable for a job transmitted from an external apparatus to the print control apparatus.

SUMMARY

According to exemplary embodiments a user can understand that continuous printing is not executable on a job transmitted to a print control apparatus when the continuous printing is not executable.

A print control apparatus includes a receiving unit configured to receive a first job and a second job, the first job and the second job including at least print setting information and image data, a determining unit configured to determine whether continuous printing processing is executable based on the print setting information included in the first job and the print setting information included in the second job, the continuous printing processing including feeding to a conveying path a recording medium to be printed based on the second job at least partially received subsequent to the first job before all recording media printed based on the first job are completely discharged, and an output unit configured to output information for displaying a screen indicating that the continuous printing processing is not executable in a case where it is determined that the continuous printing processing is not executable. In a case where the information for displaying the screen indicating that the continuous printing processing is not executable is output, the screen indicating that the continuous printing processing is not executable is displayed on a display unit. Before determining whether the continuous printing processing is executable, the print setting information included in the second job is received, and, after the information indicating that the continuous printing processing is not executable is output, the image data included in the second job is received.

A print control apparatus includes a receiving unit configured to receive a first job and a second job, the first job and the second job including at least print setting information and image data, and an output unit configured to, in a case where print setting information included in the first job and print setting information included in the second job at least partially received subsequent to the first job are at least partially different, output information for displaying a screen indicating that continuous printing processing is executable, the continuous printing processing including feeding to a conveying path a recording medium to be printed based on the second job before all recording media to be printed based on the first job are completely discharged. In a case where the output unit outputs the information, the screen indicating that the continuous printing processing is not executable is displayed on a display unit.

Further features will become apparent from the following description of exemplary embodiments with reference to the attached drawings.

DESCRIPTION OF THE EMBODIMENTS

First Embodiment

A schematic configuration of a print control apparatus according to a first embodiment will be described. According to the first embodiment, a print control apparatus can be, for example, an ink-jet printer. The print control apparatus according to the present embodiment includes printing functionality as image formation functionality, but can also include additional functions, such as scanning an image on a document for example. The print control apparatus according to the present embodiment uses a cut sheet, i.e., a sheet with a predetermined size, such as A3 or A4, acquired by cutting paper, as a recording medium for performing print processing thereon. However, this implementation is not seen to be limiting. A continuous sheet such as a roll sheet can be used for performing print processing.

The print control apparatus according to the present embodiment can form an image by directly ejecting ink to a sheet or can form an image by applying ink to an intermediate transfer body and then applying the ink to a sheet. The printing system of the print control apparatus according to the present embodiment is not limited to an ink-jet method, but can be any other printing method such as electrophotography, sublimation, and thermal transfer. The printing method of the print control apparatus according to the present embodiment is not limited to methods supporting polychrome recording using recording materials in a plurality of colors, but can be methods that support monochrome recording using black (including gray) ink only.

The print processing to be executed by the print control apparatus of the present embodiment is not limited to print processing to be performed for a visible image, but can be processing for printing an invisible image or an image that is difficult to be visually recognized. The print processing can correspond to various kinds of printing such as printing of a wiring pattern, or a physical pattern in parts manufacturing, for example, including printing of a general image and printing of DNA base sequences. In other words, the print control apparatus is applicable to various kinds of print processing that applies a recording material to a recording medium.

Various types of recording medium can be used in print processing to be executed by the print control apparatus according to the present embodiment, without limiting to sheets as described above. For example, plain paper, photographic paper, an OHP sheet, a transparent film, special-purpose paper having a metallic color acquired by pasting aluminum sheets, or a corrugated cardboard can be used. The recording material for use in print processing to be executed by the print control apparatus according to the present embodiment is not limited to liquid ink, but can be any one of various kinds of ink suitable for the printing method to be applied. For example, solid ink or toner can be used in the print control apparatus according to the present embodiment.

Figure 1:
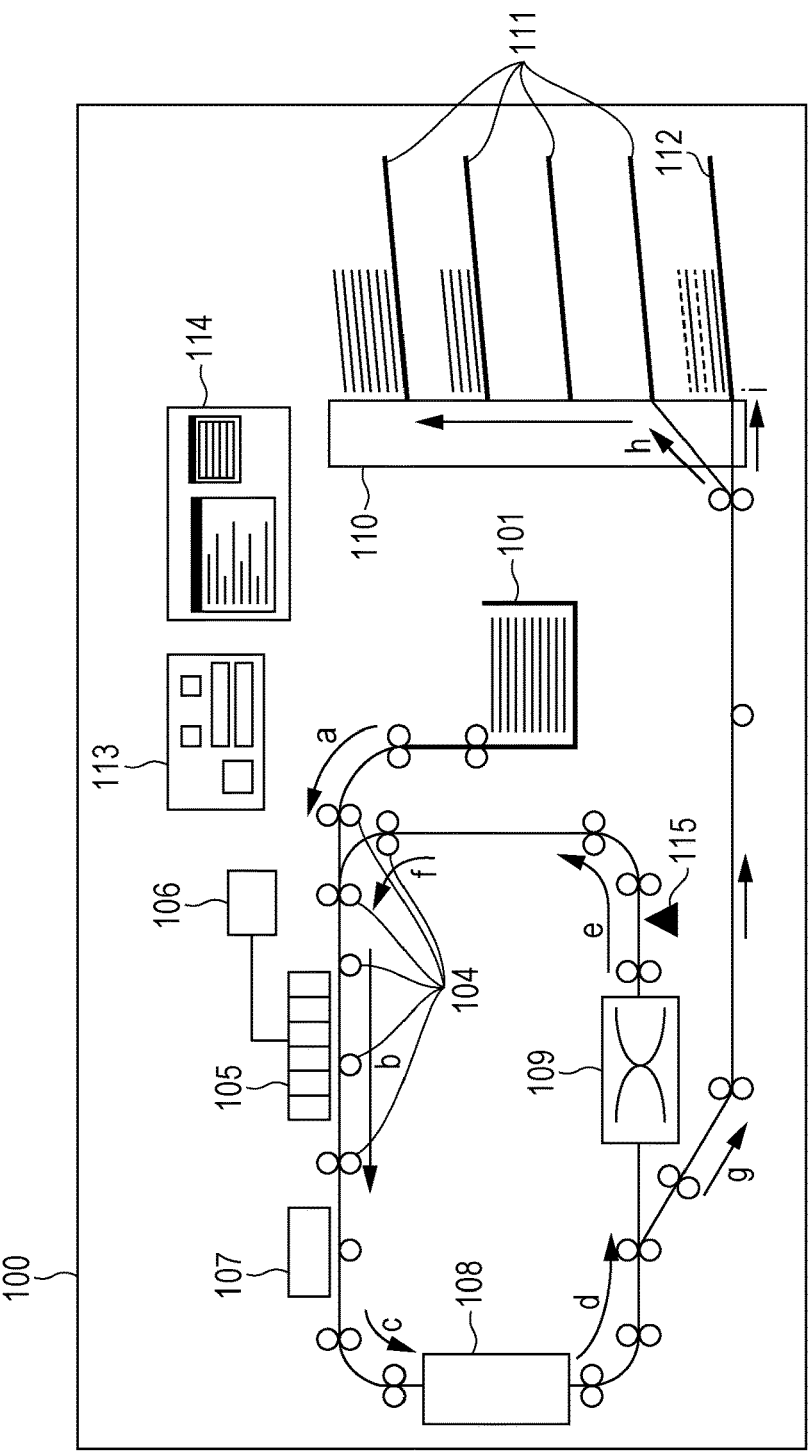
FIG. 1 is a cross-sectional view schematically illustrating a general configuration of a print control apparatus according to an embodiment.

FIG. 1 is a cross-sectional view schematically illustrating a general configuration of the print control apparatus according to the present embodiment. A printer 100 is a print control apparatus according to the present embodiment. The printer 100 includes elements 101 to 115, which will be described below. These elements can be provided within a single housing, but such an arrangement is not seen to be limiting. The elements can be divided into a plurality of housings.

A control unit 113 includes a controller, a user interface, and input/output (I/O) interfaces, and is controls the printer 100.

A sheet feeding tray 101 holds recording media, e.g., sheets, for use in printing. The printer 100 according to the present embodiment supports printing on various types of recording medium, but it is assumed here that a plurality of types of recording medium are not simultaneously set on the sheet feeding tray 101. This does not apply in a case where the sheet feeding tray 101 includes a plurality of paper cassettes. The printer 100 can start printing by using a sheet pre-held in the sheet feeding tray 101 and corresponding to a job, without receiving a sheet supplied by a user for each printing operation.

In printing, a sheet drawn from the sheet feeding tray 101 is conveyed in a direction "a" and then is conveyed in a direction "b" by a sheet conveyance rotation roller 104. Other sheet conveyance rotation rollers in addition to the rotation roller 104 can be provided on the conveying path so that a sheet can be conveyed to a predetermined location under a motor control. A sheet conveyed from the sheet feeding tray 101 passes under a print head 105 while being conveyed in the illustrated direction "b". Then, image formation based on a job is performed on the conveyed sheet by the print head 105.

The print head 105 holds a plurality of inkjet heads corresponding to colors (six colors in the present embodiment) of ink along the sheet conveying direction (direction "b"). The inkjet heads for the colors can be implemented as a single seamless nozzle chip or divided nozzle chips regularly arranged in one line or in a staggered form. The present embodiment applies a full multi-head including nozzles in a range covering a maximum width of usable sheets. As a printing method, the present embodiment applies an ink-jet method configured to eject ink through nozzles. The ink-jet method can apply a heating element, a piezoelectric element, an electrostatic element, or a MEMS element, for example. The print head 105 includes inkjet heads ejecting ink in synch with conveyance of a sheet so that an image based on print data can be formed on the sheet. Ink is supplied from an ink tank 106 (not illustrated) separately storing inks having different colors to the print head 105 through a tube.

The sheet having undergone the image formation is conveyed to a scanner unit 107 by the sheet conveyance rotation roller 104. The scanner unit 107 can be configured to optically scan an image or a special pattern on a sheet conveyed thereto to check the printability and check a state of the printer 100 such as an ink discharge condition, for example. The scanner unit 107 can scan a predetermined pattern to check an ink discharge condition and can compare the scanned image with image data based on a job to determine the printability. The checking operation can be performed by the scanner unit 107 according to various methods. The scanner unit 107 can also read a state of the back (or back surface) of a print surface (front surface) of a sheet to detect a misalignment in print position between the front surface and the back surface by using a predetermined pattern.

The sheet having undergone the scanning performed by the scanner unit 107 is conveyed in a direction "c" as illustrated in FIG. 1 and reaches a drying unit 108. The drying unit 108 is configured to heat a sheet passing through the drying unit 108 by applying hot air (heated gas or air) thereto so that ink adhered to the sheet can be dried in a short time period. Various other drying methods can be applied, such as cold air, a heater, holding a sheet for naturally drying ink, and using electromagnetic waves such as an ultraviolet ray.

A sheet having passed through the drying unit 108 is conveyed in a direction "d" as illustrated in FIG. 1 and reaches a sheet inverting unit 109. The sheet inverting unit 109 is configured to convey a sheet such that the sheet can be turned upside down. The sheet inversion can be executed by a switch back method or a method that slightly twists a conveying path.

The sheet having passed through the inverting unit 109 is turned upside down to be conveyed in a direction "e" as illustrated in FIG. 1. The sheet is further conveyed in a direction "f" as illustrated in FIG. 1 and is returned again to the conveying path (path in the direction "b" in FIG. 1) where the print heads are provided so that image formation can be performed on the opposite surface of the surface having undergone printing.

A path "b-c-d-e-f-b" (circulation path) in FIG. 1 is configured as a path for circulating a sheet, and the sheet is turned upside down every conveyance on the circulation path. The number of sheets that can simultaneously exist on the circulation path is called a number of circulatable sheets. The number of circulatable sheets depends on the sheet size. For example, when the number of circulatable sheets having an A3 size is equal to three, it means that a maximum of three A3-size sheets can be simultaneously conveyed on the circulation path.

The sheet having undergone printing is conveyed in a direction "g" in FIG. 1 without passing through the sheet inverting unit 109 and reaches a sorting unit 110. In other words, a sheet to undergo one-sided printing is conveyed in the direction "g" in FIG. 1 in the middle of the first circulation, while a sheet to undergo double-sided printing is conveyed in the direction "g" in FIG. 1 in the middle of the second circulation.

The sorting unit 110 holds a discharge tray 111 configured to discharge a sheet that has successfully printed and a waste tray 112 configured for discarding a sheet used in a maintenance operation or a poor-quality sheet, and different tray numbers are assigned to the trays. The sorting unit 110 discharges to the discharge tray 111 a sheet passing through the unit in a direction "h" in FIG. 1 and conveys to the waste tray 112 a sheet passing through the unit in a direction "i". The tray to which a sheet is to be discharged from among the plurality of discharge trays 111 is determined based on settings for a job corresponding to an image formed on the sheet to be discharged. These configurations are not seen to be limiting. The tray to which a sheet is to be discharged can be determined, for example, by the printer 100 based on a user's operation performed on a source (external apparatus) of a job or based on whether any tray is vacant. The sorting unit 110 can discharge a predetermined or less number of sheets to one tray. When the number of sheets printed by one job is greater than the predetermined number, the sheets are discharged to a plurality of trays. The number, size, and type of sheet to be discharged can depend on the size (type) of tray.

The sorting unit 110 can provide a state of each tray by presenting it on a display device. The states to be notified can include states that a sheet is being discharged, that the sheet discharging has completed, or that there is no vacant tray. In this case, the sorting unit 110 can notify various states of a tray to a user by, for example, changing the colors of a plurality of LEDs provided for trays and configured to emit light beams in different colors from each other or by changing the flashing states of the LEDs.

A user can use the operating unit 114 to perform various operations and to be provided with various kinds of information. The operating unit 114 can notify a user of a print state relating to a job, such as the tray holding a sheet on which an image designated by a user has been printed and whether the image is in printing or has been completely printed. The operating unit 114 can notify a user of states of the printer 100, such as a remaining ink amount, the number of remaining sheets, or an error state. A user can use the operating unit 114 to instruct execution of an apparatus maintenance operation, such as head cleaning, and for instructing a print process.

The sheet sensor 115 is configured to determine whether a sheet has reached a position where the sheet sensor 115 is disposed. If it is detected that a sheet has reached the position where the sheet sensor 115 is disposed, it means that the sheet is fed enough within the circulation path. Therefore, feeding from the sheet feeding tray is stopped. A plurality of sheet sensors 115 can be provided in the printer 100, and the positions of the sheet sensors 115 can be changed in accordance with the size of a sheet to be fed into the circulation path or the transfer speed of a sheet within the circulation path.

Figure 2:
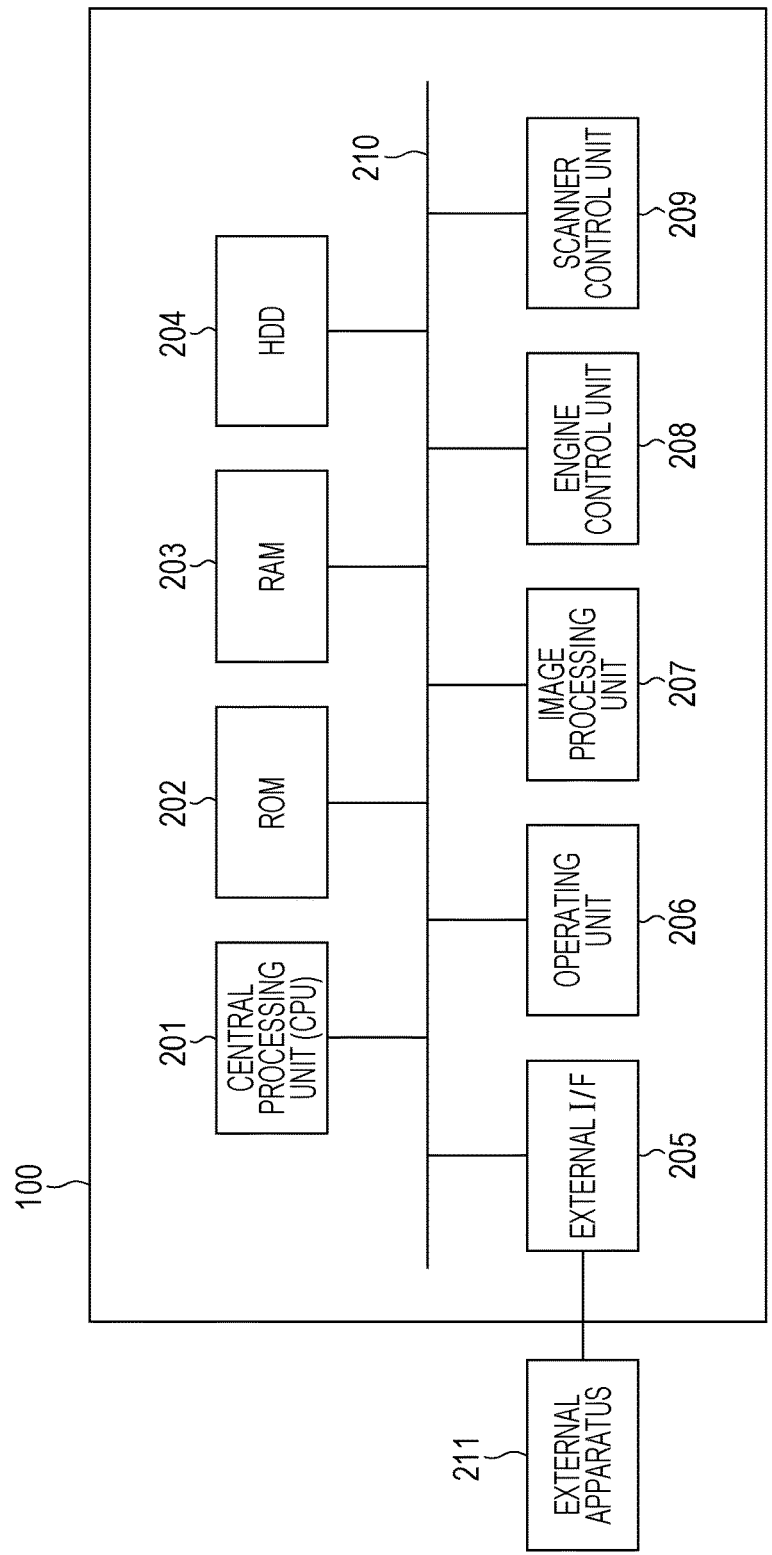
FIG. 2 is a block diagram illustrating a schematic configuration of a print control apparatus according to the embodiment.

FIG. 2 is a block diagram illustrating a schematic configuration of the printer 100. A CPU 201, a ROM 202, a RAM 203, an image processing unit 207, an engine control unit 208, and a scanner control unit 209 correspond to the control unit 113. An HDD 204, an operating unit 206, an external I/F 205, and so on are connected to the components corresponding to the control unit 113 through a system bus 210.

The CPU 201 is a central processing unit in the form of microprocessor (microcomputer) and is configured to operate the printer 100 by executing a program or activating a hardware module.

The ROM 202 stores programs such as a control program and an installed operating system (OS) program to be executed by the CPU 201. According to the present embodiment, the control program stored in the ROM 202 is configured to implement software controls such as scheduling and task switching under control of the installed OS stored in the ROM 202.

The RAM 203 includes a memory such as a SRAM (static RAM) and is configured to store setting information such as program control variables, set values registered by a user, and management data for the printer 100. This kind of data can be stored in other storage areas such as the ROM 202 or the HDD 204 instead of the RAM 203. The RAM 203 can be used as a work area by the CPU 201 or as a temporary storage area for various kinds of received data.

The HDD 204 is configured to store and read in/out control programs to be executed by the CPU 201, print data, and setting information for operations to be performed in the printer 100. When a job is input, the CPU 201 sets an ID by which the job received in a job queue within the HDD 204 can be identified for management of printing order. Another large-capacity storage device can be applied instead of the HDD 204, or information to be stored on the HDD 204 can be stored in other storage areas such as the ROM 202 and the RAM 203.

The operating unit 206 can include hardware keys and a touch panel usable by a user for performing various operations and a display unit for presenting (notifying) various information to a user and corresponds to the operating unit 114 in FIG. 1. Such information can be presented to a user by outputting audio (beep or sound) based on audio information from an audio generator.

The image processing unit 207 is configured to decompress (convert) to a bitmap image and perform image processing on image data (such as data written in page description language) included in a job received from the external apparatus 211. For example, the image processing unit 207 is configured to convert a color space (such as YCbCr) of image data input thereto to a standard RGB color space (such as sRGB). The image processing unit 207 can perform various kinds of image processing on image data, such as resolution conversion to a valid pixel count (printable by the printer 100) and, image analysis, and image correction as required. The data (print data) acquired by performing these kinds of image processing can be stored in the RAM 203 or the HDD 204.

The engine control unit 208 is configured to, for example, control over processing (or print processing) for printing an image based on print data on a sheet in accordance with a control command received from the CPU 201. For example, the engine control unit 208 can be configured to instruct to eject ink to the print heads 105 of colors, set ejection timing for adjusting the dot positions (ink impact positions) on a sheet, and perform adjustments based on acquired head drive states. The engine control unit 208 is configured to control driving of the print heads based on print data and control print heads to eject ink, and thus form an image on a sheet.

The engine control unit 208 controls conveying rollers including instructing driving of a feed roller, instructing driving of conveying rollers, and acquiring rotation states of the conveying rollers and is configured to convey and stop a sheet at an appropriate speed through an appropriate path. The engine control unit 208 in this case controls the order of sheets to be printed based on a printing order list, which will be described below.

The scanner control unit 209 is configured to determine whether an image on a sheet has correctly printed. First, the scanner control unit 209 is configured to, for example, scan an image on a sheet by instructing to drive an image sensor (such as a CCD image sensor or a CMOS image sensor) based on a control command received from the CPU 201. More specifically, the scanner control unit 209 acquires analog luminance data of red (R), green (G) and blue (B) color of an image on a sheet from the image sensor and converts the data to digital data. In this case, the image sensor can be a linear image sensor or an area image sensor. Then, the scanner control unit 209 can analyze the luminance data acquired from the image sensor to detect an ink non-discharge state of the print heads 105 or a cutting position of a sheet so that whether the image on the sheet has been correctly printed can be determined. The sheet determined as having the image correctly printed thereon by the scanner control unit 209 undergoes processing for driving a recording material on the sheet, and then is discharged to a designated tray in the sorting unit.

The external apparatus 211 is connected to the printer 100 and is configured to be a supply source of image data to be printed in the printer 100 and orders the printer 100 processing for various jobs. The external apparatus 211 will be described in detail below.

The external I/F 205 is a user interface usable for receiving image data, other commands, and status signals from the external apparatus 211. The external I/F 205 can be a local I/F or a network I/F. The communication with the external apparatus 211 in the external I/F 205 can be wireless communication for direct communication or communication through an access point external to the apparatus on a wired network. The communication method can be, for example, Wi-Fi® or near field communication (NFC, ISO/IEC IS18092). A plurality of external I/Fs 205 can be provided. According to the present embodiment, the printer 100 includes two external I/Fs 205 with different communication speeds from each other.

The components within the printer 100 are connected through a system bus 210 so that they can communicate with each other.

In the above-described configuration example, one CPU 201 controls all elements within the printer 100 illustrated in FIG. 2. However, this configuration is not seen to be limiting. In other words, some of functional blocks can include a separate CPU, and the CPU can independently control the corresponding block. The functional blocks can be implemented in various forms, such as being assigned as an independent processing unit or control unit instead of the configuration illustrated in FIG. 2, or some of the functional blocks can be integrated. Direct Memory Access Controller (DMAC) can be used for reading out data from a memory.

The external apparatus 211 is connected to the printer 100 and is configured to be a supply source of image data to be printed by the printer 100. According to the present embodiment, the external apparatus 211 issues a job including the image data to the printer 100 to cause the printer 100 to print image data. The external apparatus 211 can be a mobile terminal, a personal computer (PC), a tablet terminal, a PDA (Personal Digital Assistant), or a digital camera, which can be a supply source of image data. The external apparatus 211 can be an apparatus configured to capture an image to generate image data, such as a reader (scanner) configured to scan an image on a document to generate image data and a film scanner configured to scan a negative or positive film to generate image data. A photo storage can be installed over a network, or the external apparatus 211 can include a socket to which a detachable portable memory can be inserted so that the external apparatus 211 can read an image file stored in the photo storage or the portable memory to generate image data. The external apparatus 211 can be an element of the printer 100.

In a case where the external apparatus 211 is a PC, an OS, application software configured to generate image data and a printer driver for the printer 100 are installed in a storage device in the PC. The printer driver can control the printer 100 and convert image data supplied from application software to a format supported by the printer 100 to generate print data. Print data can be converted to image data in the external apparatus 211, and the resulting image data can then be supplied to the printer 100. All of the processes need not be implemented in software, and part or all of the processes can be implemented in hardware.

According to the present embodiment, the external apparatus 211 transmits a job to the printer 100. The term "job" refers to a job including print setting information and image data. The print setting information stores information regarding settings relating to printing to be executed by the job. For example, the print setting information can include information such as an identifier of a job, the number of print sheets, the size of print sheet, the paper type of print sheet, one-sided/double-sided printing setting, a resolution in printing, the number of colors to be used in printing, a job type, and polychrome/monochrome setting. The job type can indicate a print job or a maintenance job. One job can internally include one piece of print setting information and a plurality of image data sets corresponding to the number of pages to be printed.

According to the present embodiment, the external apparatus 211 divides a job into print setting information and other information (such as image data) for transmission to the printer 100. Because the other information includes image data, the data amount is significantly large. As such, according to the present embodiment, the external apparatus 211 transmits the print setting information and the other information through two external I/Fs 205 that are different from each other. The external apparatus 211 transmits the other information through the external I/F 205 with a higher communication speed than that of the external I/F 205 to be used for communication of the print setting information.

Figure 6:
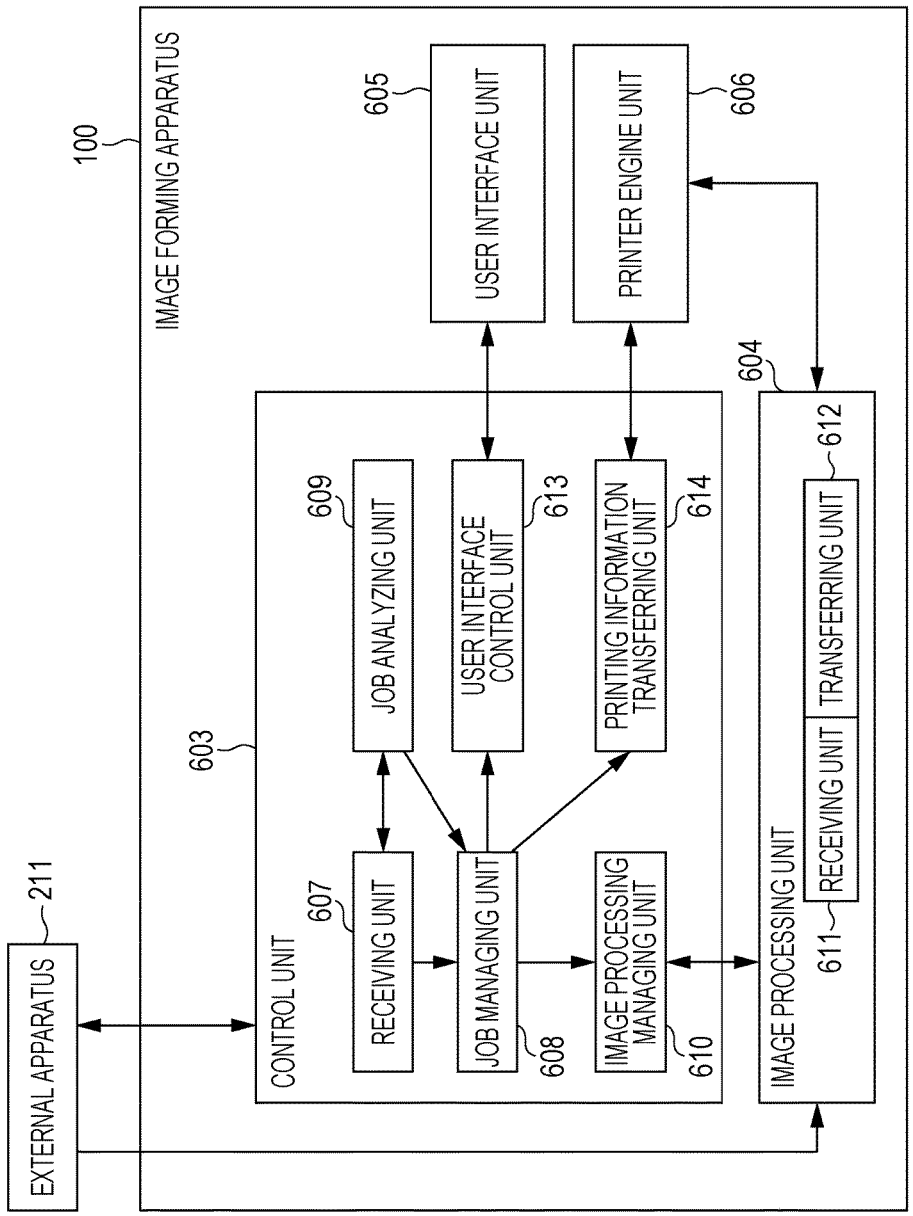
FIG. 6 is a block diagram illustrating a function of the print control apparatus according to the embodiment.

FIG. 6 is a block diagram illustrating functions included in the printer 100. The functions in the printer 100 illustrated in FIG. 6 can be implemented by the CPU 201 executing programs stored in memory such as the ROM 202 and read out to the RAM 203.

The print setting information in a job received from the external apparatus 211 is handled by a control unit 603, and the other information is handled by an image processing unit 604.

In the printer 100, the control unit 603 generates a command and data to be used in a printing information transferring unit 614 based on an analysis result of print settings received from the external apparatus 211 or in response to an instruction from a user interface unit 605.

In the printer 100, the user interface unit 605 displays receipt of an operation instruction or a state of the printer 100 on a display unit (not illustrated) included in the printer 100.

In the printer 100, the printer engine unit 606 receives a command based on the print setting information handled by the control unit 603 and image data handled by the image processing unit 604. In the printer 100, the printer engine unit 606 performs printing on a recording medium based on the received information.

In the printer 100, a receiving unit 607 receives the print setting information from the external apparatus 211 and stores it in memory. The stored information is handled by the control unit 603. In the printer 100, the receiving unit 607 notifies the external apparatus 211 of a result of analysis performed by a job analyzing unit 609.

In the printer 100, a job management unit 608 controls functions of an image processing management unit 610 and a printing information transferring unit 614 and controls order of transmission of print setting information and image data.

In the printer 100, the job analyzing unit 609 analyzes print setting information received from the external apparatus 211. More specifically, for example, in the printer 100, the job analyzing unit 609 executes processing in S402, S405, and S406, which will be described below.

In the printer 100, the image processing management unit 610 manages an image process instructed by the job management unit 608.

In the printer 100, the printing information transferring unit 614 provides the printer engine unit 606 print setting information, number-of-fed sheets information, and status information instructed by the job management unit 608.

In the printer 100, the image processing unit 604 receives image data from the external apparatus 211 and stores the received image data in memory and then performs an image process on the image data. The print data having undergone the image process are written in a transferring unit 612. Then, the image processed print data are transferred to the printer engine unit 606.

Figure 3:
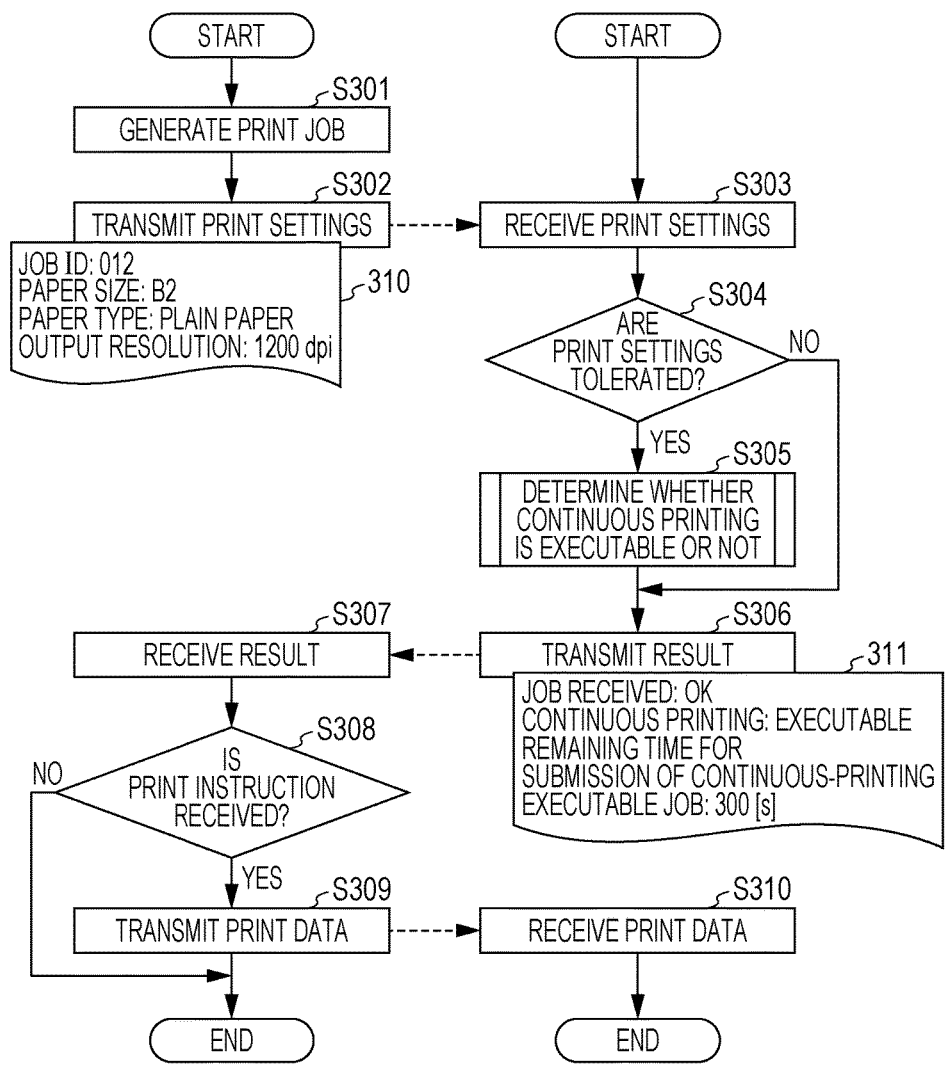
FIG. 3 is a flowchart illustrating processes to be executed by the print control apparatus and an external apparatus according to the embodiment.

FIG. 3 is a flowchart illustrating processing executed by the printer 100 and the external apparatus 211 according to the present embodiment. The processing executed by each of the apparatuses in this flowchart can be implemented by a CPU, included in the respective apparatus, executing programs stored in a memory such as a ROM included in the respective apparatus and read to a RAM.

First, the external apparatus 211 generates a job in S301. A job can be generated by converting image data or data in a PDL format to a format receivable by the printer 100 and adding information such as print setting information to the converted data. In a case where a previously generated job is to be transmitted to the printer 100, the processing can be omitted.

Next, the external apparatus 211 transmits a part corresponding to print setting information in the generated job to the printer 100 (S302). Print setting information 310 is an example of the information to be transmitted. The print setting information 310 contains setting information relating to a printing operation to be executed by the job.

When the printer 100 receives the print setting information in S303, the printer 100 analyzes print setting information in S304. The printer 100 analyzes the print setting information by determining whether settings of the setting items included in the print setting information are tolerated in the printer 100. For example, in a case where print setting information including paper size information indicating B1 is submitted to the printer 100 that can handle B2 as a maximum sheet size, it is determined that the setting is not tolerated in the printer 100. For example, in a case where settings are not consistent, such as a case where the job type is set to maintenance and double-sided printing is selected in the one-sided/double-sided printing setting, the printer 100 determines that these settings are not tolerable by the printer 100.

If the printer 100 determines in S304 that settings of the setting items included in the print setting information are tolerable by the printer 100, whether continuous printing processing is executable is determined in S305 based on the print setting information received in S303. The continuous printing is a print operation for performing printing continuously on a plurality of recording media without stopping the supply and conveyance of the recording media. In other words, the continuous printing is a print operation for feeding a recording medium to be printed subsequently to a preceding recording medium before the preceding recording medium is completely discharged.

In a case where continuous printing is performed in jobs, a sheet to be printed based on a job to be processed subsequently to a preceding job is fed to the conveying path before all of sheets printed based on the preceding job are completely discharged. The printer 100 determines whether the continuous printing is executable based on factors such as common settings in the print setting information between jobs to be processed in the continuous printing and a time period to submission of a subsequent job in the continuous printing. Details of the processing in S305 will be described below with reference to FIG. 4.

Figure 5:
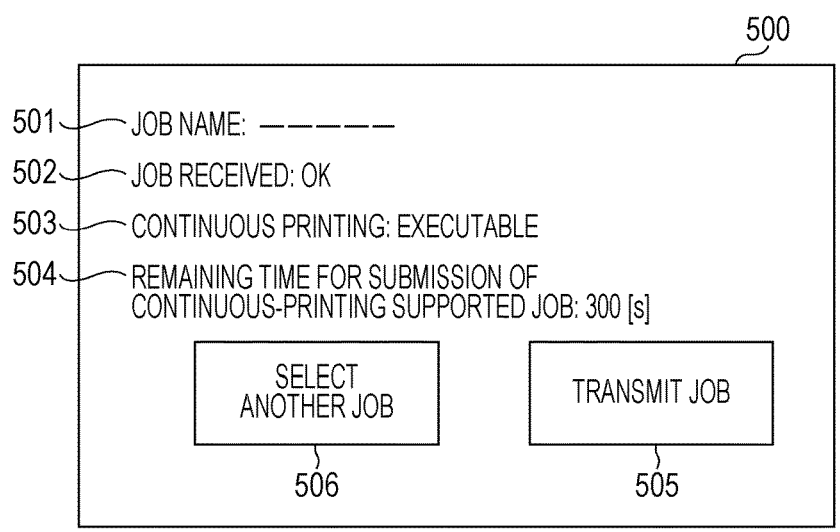
FIG. 5 illustrates a screen example to be displayed on the print control apparatus and the external apparatus according to the embodiment.

The printer 100 in S306 transmits (outputs) to the external apparatus 211 information (determination result information) for displaying a screen indicating results of the determination in S304 and S305 so that the results of the determination in S304 and S305 can be provided to a user. A determination result 311 is an example of the information to be transmitted. The determination result 311 can include information indicating whether the continuous printing is executable and a time period to the time when the continuous printing becomes un-executable. In this case, the printer 100 can transmit (outputs) the determination result information to a display unit (not illustrated) included in the printer 100 so that the display unit can display a screen (as illustrated in FIG. 5, for example) indicating results of the determinations in S304 and S305.

When the external apparatus 211 receives the determination result information in S307, the external apparatus 211 displays a screen (as in FIG. 5, for example) indicating the results of the determinations in S304 and S305 on a display unit included in the external apparatus 211 so that the results of the determinations in S304 and S305 can be provided to a user. Based on the displayed information, a user can determine whether the rest (image data) of the job is to be transmitted to the printer 100.

An example of the screen providing results of the determinations in S304 and S305 will be described with reference to FIG. 5. A screen 500 displays results of the determinations in S304 and S305. An item 501 indicates a name of a job for which the possibility of the continuous printing is determined. An item 502 indicates a result of the determination in S304. An item 503 indicates a result of the determination of the possibility of the continuous printing in S305. An item 504 indicates the remaining time period of the time period for performing the continuous printing on a job for which the possibility of the continuous printing is determined.

The external apparatus 211 can transmit the rest of a job within the time period indicated under the item 504 so that the rest of the transmitted can undergo the continuous printing. A button 505 can be used for determining the rest of a job for which the possibility of continuous printing is determined and executing the printing based on the job. A button 506 can be used for cancelling the transmission of the rest of the job for which the possibility of continuous printing is determined and determining the possibility of continuous printing for another job.

When the button 506 is selected, a screen indicating a list of jobs that can be transmitted by the external apparatus 211 is displayed, and print setting information included in a job selected on the screen is transmitted to the printer 100. Thus, the processing from S302 is re-executed. Subsequently, the external apparatus 211 determines whether an instruction to transmit the job has been received from a user. For example, the external apparatus 211 can determine whether the button 505 is selected on the screen illustrated in FIG. 5. If the button 505 is selected, the external apparatus 211 determines that an instruction to transmit the job has been received from a user. If the button 506 is selected or if a cancel button (not illustrated) is selected, it is determined that no instruction to transmit the job has been received from a user.

If it is determined that the instruction to transmit the job has been received from the user, the external apparatus 211 in S309 transmits the rest (image data) of the job to the printer 100. The printer 100 having received the rest of the job, performs print processing based on the received job (the data received in S303 and the data received in S310). If the continuous printing is executable, the printer 100 instructs to feed the number of sheets corresponding to the received job to the control unit 113. The printer 100 then feeds the sheets corresponding to the job (preceding job) to be processed immediately before the received job (subsequent job) and then, without stopping the conveyance, feeds sheets corresponding to the subsequent job so that printing operations based on the subsequent job and the preceding job is continuously performed.

If the continuous printing is not executable, the printer 100 pauses the print engine after completion of the print based on the preceding job, and pauses the conveyance of a sheet. Then, after preparation for printing is performed by an operator, for example, such as setting sheets and collecting discharged sheets, the printer 100 re-activates the print engine and executes the printing operation based on the subsequent job.

If the external apparatus 211 receives an instruction to cancel the transmission of the rest of the job (by operating the button 506), the external apparatus 211 can, for example, notify the instruction to the printer 100. If the printer 100 receives the instruction, the received print setting information can, for example, be deleted.

Figure 4:
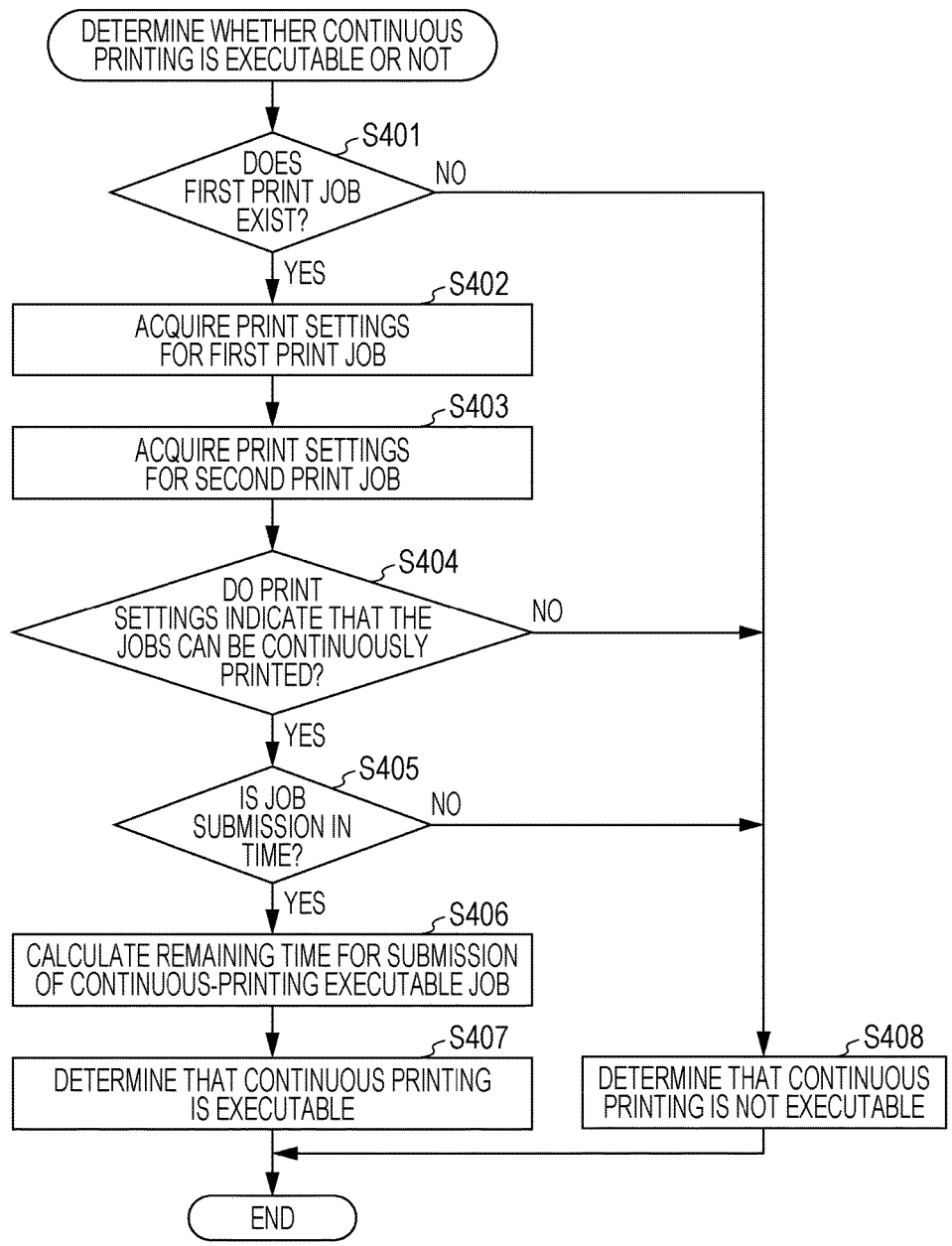
FIG. 4 is a flowchart illustrating processing in which the print control apparatus according to the embodiment determines whether continuous printing is executable.

FIG. 4 is a flowchart illustrating processing for determining the possibility of continuous printing by the printer 100 according to the present embodiment. In the flowchart, processes to be executed by the printer 100 are implemented by the CPU 201 executing programs stored in memory such as the ROM 202 and read out to the RAM 203. Hereinafter, a job submitted to the printer 100 is called a first job while a job submitted to the printer 100 subsequent to the first job is called a second job. The processing illustrated in the flowchart corresponds to the processing in S305 in FIG. 3 and starts after print setting information corresponding to the second job is submitted to the printer 100 and the processing in S304 is executed.

First, the CPU 201 determines whether the first job exists in S401. In other words, the CPU 201 determines whether the processing on the first job has completed. The possibility of continuous printing is determined with reference to a relationship between a job (first job) in processing and a newly submitted job (second job). Therefore, if the first job does not exist, it is directly determined that continuous printing is not to be performed. If it is determined that the first job does not exist, the CPU 201 then moves to S408 where it is judged that continuous printing is not executable.

If it is determined that the first job exists, the CPU 201 acquires print setting information for the first job and the second job in S402 and S403.

Next, the CPU 201 in S404 determines whether continuous printing on the first job to the second job is executable. More specifically, the CPU 201 determines whether the print settings for the first job and the print settings for second job have an identical set value under a specific print item. For example, if the print settings for the first job and the print settings for the second job have set values all being identical under the print items of paper size, paper type, one-sided/double-sided printing setting, print resolution, the number of print colors, the CPU 201 determines that the print settings indicate that the jobs can be continuously processed for printing. The CPU 201 then moves to S405. If the print settings for the first job and the print settings for the second job have different set values under one of the setting items, the CPU 201 determines that the continuous printing is not executable and moves to S408.

It is determined that the continuous printing is not executable because, if the print settings for the jobs have different values, there is a possibility that methods for printing for the jobs are different from each other and there is a possibility that the operation can be stopped between the processing for the jobs to change the printing method.

For example, according to the present embodiment, a plurality of types of recording media cannot be set on the sheet feeding tray 101. This can require loading sheets corresponding to the print settings for the second job on the sheet feeding tray 101 after the printing based on the first job completes if the print settings for the jobs have different set values relating to the sheets to be printed. In a case where set values relating to sheets to be printed are different in the print settings for the jobs, different sheets are to be supplied between the jobs. However, because of the configuration of the sheet feeding tray 101, different sheets cannot be continuously supplied. According to the present embodiment, if set values relating to sheets to be printed are different in the print settings for the jobs, it is determined that the continuous printing is not executable.

For example, when print settings of jobs have different set values relating to a resolution of printing, it means that the image data included in the jobs have significantly different data sizes. For example, when the first job applies 600 dpi and the second job applies 1200 dpi, the data size of the image data included in the second job is approximately four times the data size of the image data included in the first job. In this case, it takes a longer time for receiving the image data included in the second job than the time for receiving the image data included in the first job, and the printing speeds differ based on the image data in the first job and the second job. Furthermore, the number of sheets to be circulated in one operation and the circulation speed can differ in the processing of the jobs. According to the present embodiment, in a case where print settings for jobs have set values different in resolution for printing, it is determined that the continuous printing is not executable.

For example, in a case where print settings of jobs have different set values in number of colors to be used for printing, i.e., polychrome/monochrome setting, one-sided/double-sided printing setting or the like, the number of sheets to be circulated in one operation, the circulation speed, and the circulation path can differ based on a configuration of the apparatus.

The type of processing to be executed can differ between jobs when the job types are different, e.g., print processing for a print job and maintenance processing for a maintenance job. Therefore, the continuous printing is not executable.

For the above-described reasons, according to the present embodiment, if print settings for the first job and print settings for the second job have different set values even under one item of the setting items, it is determined that the continuous printing is not executable.

The CPU 201, for example, can determine that the continuous printing is executable in a case where the print settings for the jobs have different set values not relating to the printing method and the circulation method. Some functionality and apparatus configurations of the printer 100 can, for example, tolerate a difference in set value under one of the setting items. In some cases, the sheet feeding tray 101 can, for example, have a plurality of paper cassettes, and recording media corresponding to the first job and recording media corresponding to the second job are set in the plurality of paper cassettes. If the recording media corresponding to the jobs can be continuously fed in such a case, the CPU 201 can determine the continuous printing is executable, even though the print settings for the jobs have different set values relating to recording media to be printed.

In some apparatus configurations, the same types of sheets or the same sheet circulation method can be used in accordance with a difference in the number of colors to be used or the polychrome/monochrome setting. In this case, the CPU 201 can determine that the continuous printing is executable, even though the print settings for the jobs have different set values relating to the number of colors to be used for printing or the polychrome/monochrome setting.

In S405, the CPU 201 determines whether the rest (image data) of the second job can be submitted to the continuous printing in time. As described above, the CPU 201 receives the rest of the job from the external apparatus 211 after transmitting the determination result in S306. Thus, a time lag occurs between the time for executing the processing on the flowchart and the time for receiving the rest of the job from the external apparatus 211. This can cause a break of sheet feeding before the printing based on the second job is performed if the time for executing the processing on the flowchart is immediately before or after the last sheet used for printing, based on, for example, the first job being drawn out from the sheet feeding tray. This means that the continuous printing is not executable.

Accordingly, the CPU 201 performs the determination in S405 with reference to the progress of the processing based on the first job. More specifically, the CPU 201 determines whether the last sheet of sheets to be printed based on the first job has been drawn out from the sheet feeding tray (all sheets to be printed based on the first job have been fed). If the CPU 201 determines that the last sheet has been drawn out from the sheet feeding tray, the CPU 201 then determines that the rest (image data) of the second job cannot be submitted to the continuous printing in time, and determines in S408 that the continuous printing is not executable.

If the CPU 201 determines that the last sheet has not been drawn out from the sheet feeding tray, the CPU 201 then determines that the rest (image data) of the second job can be submitted to the continuous printing in time. Then, the processing moves to S406. The determination is not limited to the determination with reference to the feeding state of the last sheet because there is a time lag between the time for the determination and the time for receiving the job, as described above. The determination can refer to a sheet feeding state of one of sheets on which printing based on the first job is to be performed. Therefore, for example, the CPU 201 can determine whether the second sheet from the last one of sheets to be printed based on the first job has been drawn out from the sheet feeding tray.

The CPU 201 in S406 calculates a time period to the time when the continuous printing becomes un-executable (or the remaining time of the time period in which the second job can be received for executing the continuous printing). The execution of the continuous printing is not executable if it takes time for receiving the second job even though it is determined the continuous printing is executable at the time of the determination in S405. The CPU 201 executes the calculation in order to notify a user of the time period to the time when the execution of the continuous printing becomes un-executable. More specifically, the CPU 201 calculates and acquires a time period to a time when the last sheet is fed among sheets to be used for printing based on the first job.

A sheet is drawn out from the sheet feeding tray at predetermined time intervals. Thus, the time period to a time when the execution of the continuous printing becomes un-executable can be calculated from the number of sheets that have not been fed to the circulation path yet. For example, in a case where the printer 100 feeds one sheet per second and where 90 sheets of sheets to be utilized for printing based on the first job have not been fed to the circulation path, the time period to the time when the execution of the continuous printing becomes un-executable is equal to 90 seconds.

In consideration of a time lag, as in S406, the time period to the time when a sheet, which is not the last sheet, is fed can be calculated. In a case where there is a time lag from reception of a job to sheet feeding for execution of printing based on the received job because, for example, the corresponding image processing takes time, the CPU 201 can calculate a value in consideration of the time lag. Then, in S407, the CPU 201 can determine that the continuous printing is executable, and the processing ends.

As described above, the printer 100 according to the present embodiment first acquires partial information (print setting information) of a job from the external apparatus 211. Based on the acquired print setting information, print setting information for the preceding job and the processing state of the preceding job, the printer 100 determines whether the job corresponding to the received print setting information can undergo continuous printing after the preceding job. Then, the determination result is notified to the external apparatus 211. A user operating the external apparatus 211 can, based on the provided determination result, determine whether the rest (image data) of the job is to be transmitted to the printer 100. This can prevent the continuous printing from being stopped because, for example, a user transmits the rest (image data) of the job to the printer 100 when the continuous printing is not to be stopped.

A user, for example, can newly transmit print setting information of another job to the printer 100 in response to the notification that the continuous printing is not executable for one job to determine whether continuous printing for the other job is executable. Thus, a user can determine whether continuous printing is executable for each job transmittable by the external apparatus 211, so that a job for which continuous printing is executable can only be transmitted to the printer 100.

According to the present embodiment, whether the rest of the job excluding the print setting information is to be transmitted is determined based on a user operation performed on the external apparatus 211. Thus, a user can transmit a job for which the continuous printing is not executable in a case where, for example, there is no job for which continuous printing is executable, where the continuous printing can be stopped, or where one job is to be processed even by stopping the continuous printing.

Other Embodiments

The printer 100 can determine the possibility of continuous printing by a method other than the determination method in the above-described embodiment. Determination of the possibility of continuous printing by other methods will be described below.

The printer 100 according to another embodiment conveys sheets at different transfer speeds between a case where the number of prints is greater than or equal to a threshold value K and a case where the number of prints is less than the threshold value K. As an example, the printer 100 according to the present embodiment can set the speed for conveying sheets to a first transfer speed if the number of prints falls in a range of one to three and can set the speed for conveying sheets to a second transfer speed higher than the first transfer speed if the number of prints is greater than or equal to four. Thus, the threshold value K is set to "4".

A reason for changing the sheet transfer speed in accordance with the number of prints by the printer 100 according to the present embodiment will be described below.

It is assumed, for example, that the printer 100 can complete image processing relating to image data of a resolution 600 dpi (B2 size) in one second by the image processing unit 604. In this case, the printer 100 would supposedly take four seconds for completing image processing relating to image data of a resolution 1200 dpi (B2 size).

In a case where printing is performed on one recording medium every one second and the number of prints is greater than or equal to four, the time period taken for printing all materials to be printed on one page is greater than or equal to four seconds. Thus, in four seconds, while printing is being performed on four sheets of the page, the image processing relating to image data of a resolution 1200 dpi (B2 size) can be performed by the image processing unit 604.

If the number of prints is less than or equal to three, the time period for printing all of materials to be printed on one page is less than or equal to three seconds. Then, in three seconds while the printing relating to the page is being performed, the image processing relating to image data of a resolution 1200 dpi (B2 size) cannot be performed by the image processing unit 604.

Accordingly, the printer 100 of the present embodiment adjusts a printing time period and an image processing time period by reducing the sheet transfer speed if the printing time period for one page is longer than the image processing time period for the page subsequent to the one page. More specifically, the printer 100 according to the present embodiment can set the speed for conveying sheets to a first transfer speed if the number of prints falls in a range of one to three and can set the speed for conveying sheets to a second transfer speed higher than the first transfer speed if the number of prints is greater than or equal to four.

Thus, for example, when a first print job is for printing four sheets and a second print job is for printing three sheets, the transfer speed for the first print job is different from the transfer speed for the second print job. Sheets to be used in print jobs involving different transfer speeds cannot be conveyed through an identical conveying path. Therefore, the printer 100 determines that the continuous printing is executable if both of the number of sheets to be printed in the first print job and the number of sheets to be printed in the second print job are greater or less than a threshold value. The printer 100 determines that the continuous printing is not executable if the number of sheets to be printed in one of the jobs is greater than the threshold value and the number of sheets to be printed in the other job is less than the threshold value.

According to the above-described embodiment, the execution of the determination in S405 is followed by the execution of the processing in S406, however, this is not seen to be limiting. For example, after the time period to a time when the continuous printing becomes un-executable is calculated in S406, the determination in S405 can be executed with reference to the calculated time period. In this case, the CPU 201 determines that the continuous printing is not executable if, for example, the processing for the first job previously completed and the time period to the time when the continuous printing becomes un-executable is equal to zero.

The CPU 201 determines that the continuous printing is executable if the time period to the time when continuous printing becomes un-executable is greater than or equal to zero. In this case, in consideration of a time period for notifying a determination result or for receiving a remaining job, the threshold value to be used for the determination in S405 can be arbitrarily set.

According to the above-described embodiment, when continuous printing is executable for a job, information regarding the determination result is transmitted, and a screen indicating that continuous printing is executable for the job is displayed. However, this is not seen to be limiting. For example, the printer 100 may not transmit the determination result information if continuous printing is executable for a given job. If, for example, the external apparatus 211 is notified that continuous printing is executable for a job, the external apparatus 211 can automatically (without receiving a job transmit instruction from a user) transmit a remaining job without displaying a screen indicating the determination result.

The screen indicating a determination result as illustrated in FIG. 5 displays a button for instructing to transmit a job and a button for cancelling the transmission of a job. However, this is not seen to be limiting. The screen can notify that continuous printing is not executable for the job. In this case, the external apparatus 211 can receive an instruction to transmit a job or an instruction to cancel transmission of a job by, for example, a program (such as a job management program) other than a program configured to display a determination result.

According to the above-described embodiment, the printer 100 receives jobs in divisions. However, this is not seen to be limiting. For example, the printer 100 can receive jobs simultaneously. In this case, for example, the printer 100 determines the possibility of continuous printing for a received job with reference to print setting information of the received job. Then, after the external apparatus 211 displays a screen indicating a determination result, the external apparatus 211 receives an instruction to execute processing for the transmitted job or an instruction to cancel the processing for the transmitted job and notifies it to the printer 100. In response to the notification of the instruction to execute the processing for the job, the printer 100 executes the processing for the job when the turn of the processing for the job comes.

In response to notification of an instruction to cancel processing for a job, the printer 100 does not execute the processing for the job even if the turn of the processing for the job comes. In this case, the printer 100 can process the job for which processing has been cancelled when, for example, there is no job for which continuous printing is executable in the received jobs or in response to an instruction to execute the processing for the job for which the processing has been cancelled.

The above-described embodiment(s) can be implemented by the following processing. That is, software (program) implementing functionality of the embodiment(s) can be supplied to a system or an apparatus over a network or through a storage medium, and a computer (such as a CPU or an MPU) in the system or the apparatus reads out and executes the program for execution. The program can be executed by one computer or can be executed by a plurality of computer in a linking manner. All of the processes need not be implemented in software, and part or all of the processes can be implemented in hardware, such as an ASIC. All of the processes need not be executed by one CPU, but can be executed by a plurality of CPUs in collaboration.

According to the above-described embodiment(s), in a case where continuous printing is not executable for a job transmitted from an external apparatus to the print control apparatus, a user can understand that continuous printing is not executable for the job transmitted from the external apparatus to the print control apparatus.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-107910 filed May 30, 2016, which is hereby incorporated by reference herein in its entirety.

What is claimed is:

1. A print control apparatus comprising at least one processor, the at least one processor controls:
  a receiving unit configured to receive a first job and a second job, the first job and the second job including at least print setting information and image data;
  a determining unit configured to determine whether continuous printing processing is executable based on the print setting information included in the first job and the print setting information included in the second job, the continuous printing processing including feeding to a conveying path a recording medium to be printed based on the second job at least partially received subsequent to the first job before all recording media printed based on the first job are completely discharged;
  an output unit configured to output information for displaying a screen indicating that the continuous printing processing is not executable in a case where it is determined that the continuous printing processing is not executable; and
  an instruction receiving unit configured to receive instruction information indicating whether printing based on the second job is to be executed after the information indicating that the continuous printing processing is not executable is output,
  wherein, in a case where the information for displaying the screen indicating that the continuous printing processing is not executable is output, the screen indicating that the continuous printing processing is not executable is displayed on a display unit; and
  wherein, before determining whether the continuous printing processing is executable, the print setting information included in the second job is received, and, after the information indicating that the continuous printing processing is not executable is output, the image data included in the second job is received, wherein, in a case where the received instruction information indicates that the printing based on the second job is to be executed, printing is executed on a recording medium based on image data included in the second job, and, in a case where the received instruction information does not indicate that printing based on the second job is to be executed, printing is not executed on a recording medium based on the image data included in the second job.

2. The print control apparatus according to claim 1, further comprising:

an acquiring unit configured to acquire information indicating a remaining time of a time period for executing the continuous printing processing; and an information output unit configured to output information indicating the remaining time of the time period for executing the continuous printing processing, wherein, in a case where information for displaying a screen indicating that the continuous printing processing is not executable and information indicating the remaining time of the time period for executing the continuous printing processing are output, the screen indicating that the continuous printing processing is not executable and the remaining time of the time period for executing the continuous printing processing is displayed on the display unit.

3. The print control apparatus according to claim 2, wherein information indicating a time period to a time when a predetermined recording medium of recording media to be printed based on the first job is fed to the conveying path is acquired as information indicating the remaining time for executing the continuous printing processing.

4. The print control apparatus according to claim 1, wherein, in a case where print setting information included in the first job and print setting information included in the second job are at least partially different, it is determined that the continuous printing processing is not executable; and wherein, in a case where the print setting information included in the first job and the print setting information included in the second job are not different, it is determined that the continuous printing processing is executable.

5. The print control apparatus according to claim 1, wherein, in a case where a set value relating to recording media to be printed of the print setting information included in the first job and a set value relating to recording media to be printed of the print setting information included in the second job are different, it is determined that the continuous printing processing is not executable.

6. The print control apparatus according to claim 1, wherein the determining unit determines that the continuous printing processing is not executable in a case where a set value for information indicating whether double-sided printing is to be executed in the print setting information included in the first job and a set value for information indicating whether double-sided printing is to be executed in the print setting information included in the second job are different.

7. The print control apparatus according to claim 1, wherein the print setting information includes at least one of a size of recording media to be printed, a type of recording media to be printed, a one-sided/double-sided printing setting, a resolution in printing, a number of colors to be used in printing, a polychrome/monochrome setting, or a type of job.

8. The print control apparatus according to claim 1, wherein, in a case where a predetermined recording medium is fed from among recording media to be printed based on the first job, it is determined that the continuous printing processing is not executable.

9. The print control apparatus according to claim 1, wherein, in a case where all recording media to be printed based on the first job are fed to the conveying path, it is determined that the continuous printing processing is not executable.

10. The print control apparatus according to claim 1, wherein information indicating that the continuous printing processing is not executable is output before printing based on the second job is performed.

11. The print control apparatus according to claim 1, wherein, in a case where it is determined that the continuous printing processing is executable, information indicating that the continuous printing processing is executable is output; and wherein, in a case where the information indicating the continuous printing processing is executable is output, a screen indicating that the continuous printing processing is executable is displayed on the display unit.

12. The print control apparatus according to claim 1, wherein, in a case where it is determined that the continuous printing processing is not executable, information for displaying a screen indicating that the continuous printing processing is not executable is transmitted to an external apparatus as output of the information indicating that the continuous printing processing is not executable; and wherein, in a case where the information indicating that the continuous printing processing is not executable is transmitted to the external apparatus, a screen indicating that the continuous printing processing is not executable is displayed on a display unit included in the external apparatus.

13. The print control apparatus according to claim 1, wherein the print control apparatus includes the display unit.

14. The print control apparatus according to claim 1, further comprising a printing unit configured to execute printing on a recording medium based on image data included in a job.

15. The print control apparatus according to claim 1, wherein, in a case where it is determined that the continuous printing processing is not executable, information for displaying a screen indicating that the continuous printing processing is not executable is transmitted to the display unit included in the print control apparatus as output of the information indicating that the continuous printing processing is not executable; and wherein, in a case where the information indicating that the continuous printing processing is not executable is transmitted to the display unit included in the print control apparatus by the output unit, a screen indicating that the continuous printing processing is not executable is displayed on the display unit included in the print control apparatus.

16. A control method for a print control apparatus configured to receive a first job and a second job, the first job and the second job including at least print setting information and image data, the control method comprising:

determining whether continuous printing processing is executable based on the print setting information included in the first job and the print setting information included in the second job, the continuous printing processing including feeding to a conveying path a recording medium to be printed based on the second job at least partially received subsequent to the first job before all recording media printed based on the first job are completely discharged;

outputting information for displaying a screen indicating that the continuous printing processing is not executable in a case where it is determined that the continuous printing processing is not executable; and receiving instruction information indicating whether printing based on the second job is to be executed after the information indicating that the continuous printing processing is not executable is output, wherein, in a case where the information for displaying the screen indicating that the continuous printing processing is not executable is output, the screen indicating that the continuous printing processing is not executable is displayed on a display unit, wherein, before determining whether the continuous printing processing is executable, the print setting information included in the second job is received, and, after the information indicating that the continuous printing processing is not executable is output, the image date included in the second job is received, wherein, in a case where the received instruction information indicates that the printing based on the second job is to be executed, printing is executed on a recording medium based on image data included in the second job, and, in a case where the received instruction information does not indicate that printing based on the second job is to be executed, printing is not executed on a recording medium based on the image data included in the second job.

17. A non-transitory computer-readable storage medium storing a program for causing a computer to execute the control method according to claim 16.

* * * * *